May 27, 1958   J. DE SWART   2,836,101
OPTICAL ELEMENTS
Filed Sept. 1, 1955

INVENTOR.
JAN DE SWART
BY
Christie, Parker & Hale
ATTORNEYS

United States Patent Office 2,836,101
Patented May 27, 1958

2,836,101

OPTICAL ELEMENTS

Jan de Swart, Los Angeles, Calif., assignor to De Swart Development Company, Los Angeles, Calif., a limited partnership Application September 1, 1955, Serial No. 531,864

1 Claim. (Cl. 88—57)

This invention relates to deformable optical elements.

Conventional optical systems are usually made up of a plurality of lenses made from a solid, inflexible material such as glass. The focal length of each lens is fixed and cannot be changed without regrinding the lens, and the focal length of the optical system is changed by adjusting the distance between the various lenses in the system. Adjustment of the relative positions of the lenses is sometimes awkward and in some cases requires considerable relative movement of the lenses.

In one embodiment, this invention overcomes the disadvantages of conventional lenses by providing a lens which may readily be deformed to vary its curvature, and hence its focal length. Thus the focal length of a lens or optical system may readily be changed by simply deforming the lens.

The invention is not limited to lenses, but may be an optical element shaped so as not to function as a lens i. e., not having the property of focusing light rays to form an image in an ultimate form. In this form of the invention the optical element is simply a transparent body having irregular surfaces which do not focus light rays to form images, but instead form random abstract patterns.

Briefly, the invention contemplates an optical element which includes a flexible transparent envelope adapted to hold a fluid, and means are provided for varying the amount of fluid within the envelope to change the shape and optical properties of the element.

Preferably, the envelope is made of a suitable flexible or elastic transparent plastic, such as one of the polyethylene or polyvinyl plastics.

The invention will be more clearly understood from the following detailed description taken in conjunction with the accompanying drawing in which.

Figure 1:
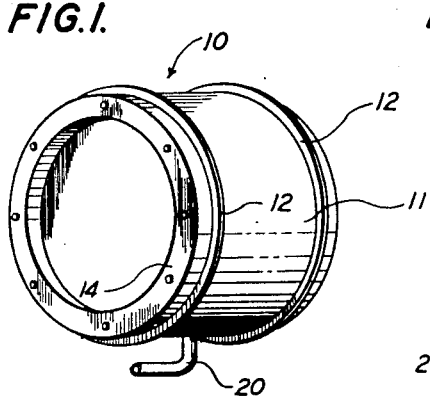
Fig. 1 is a perspective view of an optical element made in accordance with the invention to serve as a lens.
Figure 2:
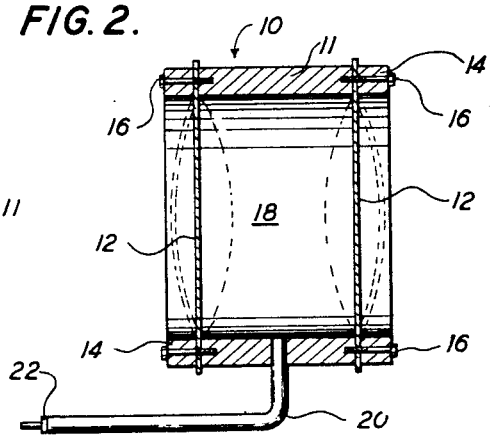
Fig. 2 is a vertical section of the apparatus of Fig. 1.

Referring to Figs. 1 and 2, a lens 10, comprises a relatively short cylindrical frame 11. A separate transparent diaphragm 12 is disposed over each end of the frame. A separate retaining ring 14 is secured by bolts 16 to each end of the frame so that the diaphragms make a fluid-tight seal with the frame and form a fluid compartment 18 within the frame. A conduit 20 is connected to the center portion of the frame to provide access to the fluid space 18. A suitable transparent fluid e. g., water or organic liquid which does not attack the diaphragm is introduced into the space 18 through the conduit and maintained under any desired pressure by any suitable means, e. g., a piston 22 disposed in the end of the conduit remote from the frame.

The transparent diaphragm may be made of any suitable flexible or elastic material, preferably it is perfectly clear and elastic. Thin sheets of polyethylene or polyvinyl plastics serve well. One such plastic particularly well suited to serve as material for the diaphragms is sold under the trade name "Bakelite Cast Film". This is available in thin, transparent elastic sheets and contains, by weight, 65% vinyl copolymer (90% vinyl chloride, 10% vinyl acetate, m. w. 50,000), 33% dioctylphthalate, and 2% dibutyltindilaurate.

To use the lens shown in Figs. 1 and 2 the piston is adjusted as required to cause the diaphragms to assume either convex or concave curvature as required and as indicated by dotted lines in Fig. 2. The element is inserted in optical systems so that the longitudinal axis of the element coincides with the optical axis of the optical system. The curvature of the diaphragms and therefore focal length of the lens is readily changed by simply changing the position of the piston 22.

Figure 3:
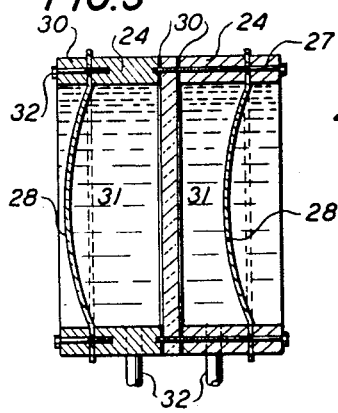
Fig. 3 is a vertical section of an alternate embodiment of the invention.

Referring to the arrangement shown in Fig. 3, a pair of cylindrical frames 24 are colinearly secured together on opposite sides of a transparent disc or partition 26 by means of a plurality of long bolts 27. A separate diaphragm 28 is disposed over each end of the frames remote from the partition and are held against the frames by separate retaining rings 30. The long bolts 27 extend through one of the retaining rings to secure it to its respective frame and a plurality of shorter bolts 32 secure the other retaining ring to its frame. Sealing gaskets 30 at each of the inner ends of the frames effect a fluid-tight seal between the frames and the partition so that a separate fluid-tight compartment 31 is formed on each side of the partition. A separate conduit 32 opens into each of the spaces 31 so that fluid can be introduced or removed from the spaces as required.

The operation of the lens of Fig. 3 is similar to that of the apparatus shown in Figs. 1 and 2. The principal difference is that in the apparatus of Fig. 3 the diaphragms can be deformed independently of each other, so that the lens can be made with concave at both ends, convex at both ends, or concave and convex at opposite ends, depending on the amount of fluid introduced into each of the compartments.

Figure 4:
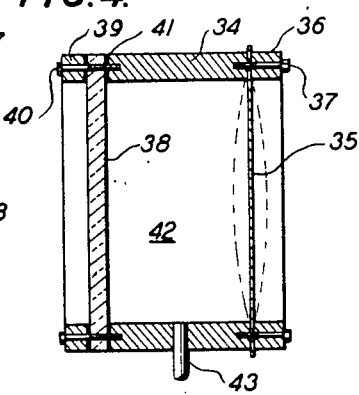
Fig. 4 is a vertical section of yet another embodiment of the invention.
Figure 5:
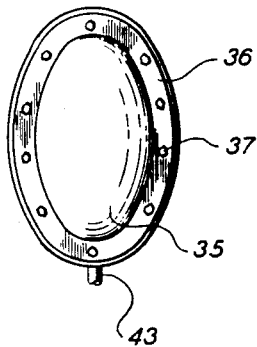
Fig. 5 is an end elevation of the apparatus of Fig. 4.

Referring to Figs. 4 and 5, a relatively short elliptical frame 34 is closed at one end by a transparent diaphragm 35 which is held over that end by a retaining ring 36 secured to the frame by bolts 37. A transparent elliptical wall 38 is secured over the opposite end of the frame and held in place by a retaining ring 39 fastened with bolts 40 into the frame. A gasket 41 between the wall and the frame effects a seal to form a fluid-tight compartment 42 within the frame. A conduit 43 opens through the frame to permit fluid to be introduced into space 42.

The apparatus of Figs. 4 and 5 is used as either a lens or optical element to produce random abstract patterns depending upon the amount of fluid disposed within the space 42.

Figure 6:
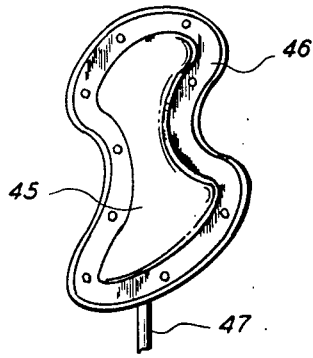
Fig. 6 is an end elevation of an optical element made in accordance with the invention which has no image forming properties, and is used in producing random, abstract patterns.

Referring to Fig. 6, the optical element shown is similar to that shown in Figs. 1 and 2 except that the frame (not shown), diaphragms 45 and retaining rings 46 have matching peripheries which are of random or irregular curvature. A conduit 47 is connected through the frame so that the amount of fluid within the element can be varied.

The optical element of Fig. 6 is not used to focus light rays, but is used to produce patterns of a random, abstract nature. The use of such an optical element or mass is disclosed in my co-pending application Serial No. 333,268, filed January 26, 1953, now abandoned. As pointed out in that application, in the production of motion pictures it is frequently the practice to include sequences of completely unrepresentational format, for example, mere ebb and flow of shapes and colours. Such sequences often represent musical impressions, thought processes, or merely artistically appreciable interludes between scenes.

Prior to the invention disclosed in my co-pending application these sequences were developed by photographing successive drawings in a series painstakingly prepared by an artist. The preparation of such a sequence often required as much as a year's time of one or more artists. By the simple method and apparatus disclosed in my co-pending application it is possible to accomplish the same ends and with better results in a matter of minutes.

The apparatus of Fig. 6 likewise permits rapid production of such a sequence. For example, an object is placed at one end of the element and the eye or a camera is positioned on the opposite side of the element. The amount of fluid in the element is then varied to cause unusual and interesting patterns to be developed on the surface of the element adjacent the camera. The sequence of patterns developed can be further varied by simultaneously rotating the element and moving the object or camera.

Figure 7:
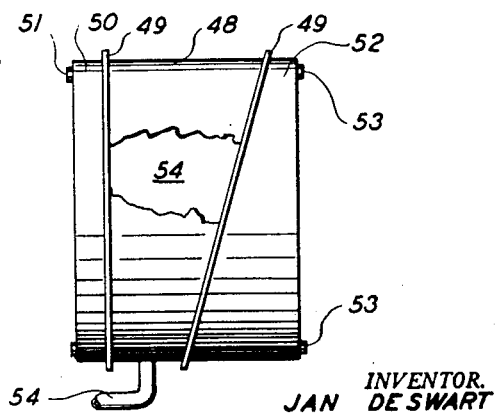
Fig. 7 is a side elevation of another embodiment of an optical element of the invention.

In Fig. 7 there is shown another embodiment of the invention which may be used to focus light rays, or which may be used as an optical element to form random, abstract patterns. A truncated cylindrical frame 48 is covered at each end by separate diaphragms 49. A cylindrical retaining ring 50 secured to the frame by means of bolts 51 holds one of the diaphragms against the normal end of the frame to form a fluid-tight seal. At the truncated end of the frame a cylindrical retaining ring 52, truncated to match the frame, is secured to the frame by bolts 53 and holds the other diaphragm against the frame at an angle to the longitudinal axis of the frame. Thus, a wedge-shaped compartment 54 is formed between the two diaphragms. A conduit 54 extends through the frame to communicate with the space therein so that the amount of fluid within the frame can be varied.

Depending on the amount of fluid disposed therein, the optical element can be used as either a distortion lens or an optical mass to form random abstract apparatus.

I claim:

An optical element forming random abstract patterns comprising a frame having a transparent portion and an opening opposite the transparent portion, the opening having an irregularly shaped boundary, a flexible, transparent diaphragm affixed to the frame at its irregular boundary over the opening to form a compartment within the frame adapted to hold a fluid, and means for varying the pressure of a fluid within the compartment to change the curvature of the surface of the transparent diaphragm.

References Cited in the file of this patent

UNITED STATES PATENTS

| | | |
|---|---|---|
| 1,241,738 | Klatte et al. | Oct. 2, 1917 |
| 2,269,905 | Graham | Jan. 13, 1942 |
| 2,300,251 | Flint | Oct. 27, 1942 |
| 2,525,921 | Madan et al. | Oct. 17, 1950 |

FOREIGN PATENTS

| | | |
|---|---|---|
| 18,919 | Great Britain | of 1892 |
| 6,534 | Great Britain | of 1911 |
| 101,260 | Great Britain | Aug. 31, 1916 |
| 258,325 | Great Britain | Sept. 15, 1926 |
| 386,721 | Great Britain | Jan. 26, 1933 |
| 628,774 | Germany | Apr. 16, 1936 |
| 859,877 | France | Sept. 20, 1940 |
| 972,995 | France | Sept. 6, 1950 |